(12) United States Patent
Amalric et al.

(10) Patent No.: US 6,353,034 B1
(45) Date of Patent: *Mar. 5, 2002

(54) COMPOSITION BASED ON ALKYL POLYGLYCOSIDES AND FATTY ALCOHOLS, AND ITS USES

(75) Inventors: Chantal Amalric, Blan; Jean-Pierre Boiteux, Saix; Alain Milius, Nice; Nelly Michel, Maisons Alfort, all of (FR)

(73) Assignee: Societe d'Exploitation de Produits pour les Industries Chimiques S.E.P.P.I.C., Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/061,183

(22) Filed: Apr. 17, 1998

(30) Foreign Application Priority Data

Apr. 21, 1997 (FR) .............................................. 97 04876

(51) Int. Cl.[7] .......................... A61K 7/02; B01F 17/34; B01F 17/56; C11D 1/825
(52) U.S. Cl. ......................... 516/72; 510/136; 510/470; 514/844; 514/846; 514/938; 514/975; 516/74
(58) Field of Search ..................... 516/72, 74; 514/844, 514/846, 938, 975; 510/470, 136

(56) References Cited

U.S. PATENT DOCUMENTS

| | | | | |
|---|---|---|---|---|
| 4,749,517 A | * | 6/1988 | Chwang et al. | 514/844 X |
| 4,889,925 A | * | 12/1989 | Schmid et al. | 514/844 X |
| 5,166,194 A | * | 11/1992 | Walker et al. | 514/975 X |
| 5,494,938 A | * | 2/1996 | Kawa et al. | 514/844 X |
| 5,510,100 A | * | 4/1996 | Picard et al. | 514/938 X |
| 5,605,651 A | * | 2/1997 | Balzer | 516/72 X |
| 5,670,471 A | * | 9/1997 | Amalric et al. | 510/416 |
| 5,817,254 A | * | 10/1998 | Wadle et al. | 516/72 X |
| 5,888,482 A | * | 3/1999 | Amalric et al. | 516/72 X |
| 5,958,431 A | * | 9/1999 | Brancq et al. | 514/938 X |

FOREIGN PATENT DOCUMENTS

WO 9206778 4/1992

* cited by examiner

*Primary Examiner*—Richard D. Lovering
(74) *Attorney, Agent, or Firm*—Dennison, Scheiner & Schultz

(57) ABSTRACT

An alkyl polyglycoside and fatty alcohol composition useful as an emulsifier includes:

a) 8 to 40% by weight of an alkyl polyglycoside component consisting essentially of:
  0 to 20% by weight of at least one alkyl polyglycoside of formula (I):

$$R_1O(G_1)_{x1} \qquad (I)$$

in which $R_1$ is a linear or branched alkyl radical having 16 or 18 carbon atoms, $G_1$ is a saccharide residue and x1 is between 1 and 5;

0 to 100% by weight of an alkyl polyglycoside of formula (II):

$$R_2O(G_2)_2 \qquad (II)$$

in which $R_2$ is a linear or branched alkyl radical having 14 carbon atoms, $G_2$ is a saccharide residue and x2 is between 1 and 5; and 0 to 100% by weight of at least one alkyl polyglycoside of formula (III):

$$R_3O(G_3)_{x3} \qquad (III)$$

in which $R_3$ is a linear or branched alkyl radical having 20 or 22 carbon atoms, $G_3$ is a saccharide residue and x3 is between 1 and 5; and b) 60 to 92% by weight of a linear or branched aliphatic alcohol having from 14 to 22 carbon atoms.

16 Claims, No Drawings

US 6,353,034 B1

COMPOSITION BASED ON ALKYL POLYGLYCOSIDES AND FATTY ALCOHOLS, AND ITS USES

BACKGROUND OF THE INVENTION

The present invention relates to a novel family of compositions based on alkyl polyglycosides and fatty alcohols, and to the use of these compositions for the preparation of emulsions.

Alkyl glycosides or alkyl polyglycosides (APG) are well-known non-ionic surface-active compounds which can be used on their own, or in association with other surfactants, in a broad range of industrial applications and especially in the cosmetics sector.

Alkyl polyglycosides were first used as foaming agents and, in this application, those with an alkyl chain containing from 8 to 14 carbon atoms were found to be of particular value.

More recently, alkyl polyglycosides have been used as emulsifiers and, in this application, those with an alkyl chain containing from 16 to 18 carbon atoms have proved to be of particular value.

Patent application WO 92/06778, in the name of the Applicant, describes for the first time the use of mixtures of alkyl polyglycosides and fatty alcohols as self-emulsifying agents.

More precisely, the mixtures described in said prior art document comprise:
from 60 to 90% by weight of at least one fatty alcohol having from 12 to 22 carbon atoms and preferably from 16 to 18 carbon atoms; and
from 10 to 40% by weight of an alkyl polyglycoside whose alkyl moiety is preferably identical to that of the fatty alcohol.

In Example 2, said document describes the use of a self-emulsifiable composition essentially consisting of alkyl polyglycosides and alcohols having 16 and 18 atoms.

The self-emulsifiable compositions described in the patent application cited above are marketed under the name Montanov® 68 and contain a mixture of alkyl polyglycosides whose fatty chains contain 16 and 18 carbon atoms, and a mixture of fatty alcohols with the same length of fatty chains.

Furthermore, patent application WO 95/13863, in the name of the Applicant, describes compositions, also based on alkyl polyglycosides and fatty alcohols, which are in the form of concentrates useful especially for the preparation of fluid emulsions.

These compositions essentially comprise a mixture of at least two alkyl polyglycosides which differ in the nature of their alkyl moiety.

It is specified that at least one of these alkyl polyglycosides contains an alkyl chain having from 16 to 22 carbon atoms and preferably from 16 to 18 carbon atoms.

It is also specified that the alkyl polyglycosides containing an alkyl chain having from 16 to 22 carbon atoms must represent at least 25% of the mixture of alkyl polyglycosides, and in all the Examples these alkyl polyglycosides contain 16 or 18 carbon atoms and represent at least 50% by weight of the mixture of alkyl polyglycosides.

Furthermore, patent application WO 96/37285, in the name of the Applicant, also describes compositions based on alkyl polyglycosides and fatty alcohols; these are useful especially for obtaining emulsions stable at low temperatures, for example at temperatures below −20° C.

These compositions essentially comprise a mixture of at least three alkyl polyglycosides which differ in the nature of their alkyl moiety.

This mixture only contains alkyl polyglycosides having 12, 14, 16 or 18 carbon atoms, it being specified that the alkyl polyglycosides having 16 and 18 carbon atoms must be present in this mixture in an amount of at least 20% by weight, based on the total weight of the mixture of alkyl polyglycosides.

In all the Examples, the alkyl polyglycosides having 16 and 18 carbon atoms represent more than 60% by weight of the mixture of alkyl polyglycosides.

Thus the compositions based on alkyl polyglycosides and fatty alcohols which have been used hitherto in the state of the art for the preparation of emulsions are essentially characterized by the presence, in the mixture of alkyl polyglycosides, of a relatively large proportion, generally in excess of about 50% by weight, of alkyl polyglycosides whose alkyl moiety has from 16 to 18 carbon atoms.

Although such compositions are perfectly satisfactory, especially in terms of the stability of the emulsions obtainable therewith, it has been observed that these emulsions are not entirely satisfactory from the point of view of their texture, and particularly with regard to sensory evaluation criteria such as ease of spreading, evanescence, absorption by the skin, and the presence of residues after spreading.

SUMMARY OF THE INVENTION

Under these conditions, the object of the present invention is to solve the technical problem which consists in providing novel compositions for the preparation of emulsions whose textural properties are significantly improved by comparison with those of the emulsions obtained from the compositions described in the state of the art, the content of which was referred to above.

The solution to this technical problem, according to the present invention, consists of novel compositions based on alkyl polyglycosides and fatty alcohols, comprising:
5 to 60% by weight of a mixture of alkyl polyglycosides essentially consisting of:
0 to 20% by weight of at least one alkyl polyglycoside of formula (I):

$$R_1O(G_1)_{x_1} \qquad (I)$$

in which $R_1$ is a linear or branched aliphatic radical having 16 or 18 carbon atoms, $G_1$ is a saccharide residue and $x_1$ is between 1 and 5;
0 to 100% by weight of an alkyl polyglycoside of formula (II):

$$R_2O(G_2)_{x_2} \qquad (II)$$

in which $R_2$ is a linear or branched aliphatic radical having 14 carbon atoms, $G_2$ is a saccharide residue and $x_2$ is between 1 and 5; and
0 to 100% by weight of at least one alkyl polyglycoside of formula (III):

$$R_3O(G_3)_{x_3} \qquad (III)$$

in which $R_3$ is a linear or branched aliphatic radical having 20 or 22 carbon atoms, $G_3$ is a saccharide residue and $x_3$ is between 1 and 5; and
95 to 40% by weight of one or more alcohols of the formula R'OH, in which R' is a linear or branched aliphatic radical having from 14 to 22 carbon atoms, and preferably of a mixture consisting of alcohols whose alkyl moiety is identical to the alkyl moiety $R_1$, $R_2$ and $R_3$ of the above-mentioned alkyl polyglycosides.

Advantageously the above-mentioned mixture of alcohols essentially consists of:

0 to 20% by weight of at least one alcohol having 16 to 18 carbon atoms;

0 to 100% by weight of at least one alcohol having 14 carbon atoms; and 0 to 100% by weight of at least one alcohol having 20 to 22 carbon atoms.

DETAILED DESCRIPTION OF THE INVENTION

Such compositions based on alkyl polyglycosides and fatty alcohols therefore differ essentially from the compositions of the state of the art in their relatively limited content of alkyl polyglycosides whose alkyl moiety contains 16 or 18 carbon atoms.

It has been discovered, totally surprisingly and unexpectedly, that such compositions make it possible to obtain emulsions with remarkable textural properties which are of particular value for their uses in the cosmetics sector.

A first preferred subfamily of compositions based on alkyl polyglycosides and fatty alcohols which can be used within the framework of the present invention consists of compositions in which the above-mentioned mixture of alkyl polyglycosides essentially consists of:

0 to 20% and preferably 0 to 15% by weight of at least one alkyl polyglycoside of formula (I) as defined above;

0 to 40% by weight of an alkyl polyglycoside of formula (II) as defined above; and 50 to 100% by weight of at least one alkyl polyglycoside of formula (III) as defined above.

A second preferred subfamily of compositions based on alkyl polyglycosides and fatty alcohols which can advantageously be used within the framework of the present invention consists of compositions in which the above-mentioned mixture of alkyl polyglycosides essentially consists of:

0 to 20% and preferably 0 to 15% by weight of at least one alkyl polyglycoside of formula (I) as defined above;

70 to 100% and preferably 90 to 100% by weight of an alkyl polyglycoside of formula (II) as defined above; and 0 to 30% and preferably 0 to 10% by weight of at least one alkyl polyglycoside of formula (III) as defined above.

The particularly preferred compositions within the framework of the present invention are those comprising: either:

8 to 40% by weight and preferably 8 to 30% by weight of the above-mentioned mixture of alkyl polyglycosides; and 92 to 60% by weight and preferably 92 to 70% by weight of one or more of the above-mentioned alcohols; or:

10 to 30% by weight and preferably 25% by weight of an alkyl polyglycoside of formula (II); and 90 to 70% by weight of an alcohol having 14 carbon atoms; or:

8 to 25% by weight and preferably 8 to 18% by weight of a mixture of alkyl polyglycosides essentially consisting of:

0 to 15% by weight of at least one alkyl polyglycoside of formula (I) as defined above;

0 to 25% by weight of an alkyl polyglycoside of formula (II) as defined in claim 1; and 75 to 100% by weight of at least one alkyl polyglycoside of formula (III) as defined above; and 92 to 75% by weight and preferably 92 to 85% by weight of a mixture consisting of alcohols whose alkyl moiety is identical to the alkyl moiety $R_1$, $R_2$ and $R_3$ of the above-mentioned alkyl polyglycosides; or:

10 to 20% by weight of a mixture of alkyl polyglycosides essentially consisting of:

20 to 40% by weight and preferably about 30% by weight of an alkyl polyglycoside of formula (II) as defined above; and 60 to 80% by weight and preferably about 70% by weight of at least one alkyl polyglycoside of formula (III) as defined above, preferably an alkyl polyglycoside having 20 carbon atoms; and 80 to 90% by weight of a mixture consisting of alcohols whose alkyl moiety is identical to the alkyl moiety $R_2$ and $R_3$ of the above-mentioned alkyl polyglycosides.

As the saccharide residue represented respectively by $G_1$, $G_2$ and $G_3$, the above-mentioned alkyl polyglycosides of formulae (I), (II) and (III) can contain a residue of glucose or dextrose, sucrose, fructose, galactose, maltose, maltotriose, lactose, cellobiose, mannose, ribose, dextran, talose, allose, xylose, levoglucosan, cellulose or starch.

Advantageously $G_1$, $G_2$ and $G_3$ are each a glucose residue.

It should also be noted that each unit of the polyoside moiety of the alkyl polyglycoside can be in the $\alpha$ or $\beta$ anomeric form and in the L or D form, and the configuration of the saccharide residue can be of the furanoside or pyranoside type.

The indices $x_1$, $x_2$ and $x_3$ represent the mean degree of polymerization of the saccharide residue. These indices will preferably represent a number between 1.05 and 2.5 and particularly preferably between 1.1 and 2.

The expression "alkyl polyglycoside" used within the framework of the present invention therefore arbitrarily denotes alkyl monoosides (degree of polymerization equal to 1) or alkyl polyglycosides (degree of polymerization greater than 1).

The alkyl polyglycosides of formulae (I), (II) and (III) are compounds whose alkyl radicals have chains of determinate length. However, these compounds can also contain minor proportions of compounds of the same type whose alkyl radicals have a longer and/or shorter chain, such compounds originating especially from the fatty alcohols, generally of natural or synthetic origin, used as starting materials for the synthesis of these alkyl polyglycosides.

The expression "essentially consisting of", used within the framework of the present patent application and the claims in order to characterize the above-mentioned mixture of alkyl polyglycosides, must therefore be understood not to exclude the presence, in the mixture of alkyl polyglycosides, of compounds whose alkyl radicals have 10, 12 or 24 carbon atoms, in a maximum cumulative amount of 10% by weight and preferably 5% by weight, based on the total weight of the mixture of alkyl polyglycosides.

The compositions according to the present invention based on alkyl polyglycosides and fatty alcohols can be prepared simply by mixing their constituents in desired predetermined proportions.

On the industrial scale they will preferably be prepared by one of the two methods conventionally used for the synthesis of alkyl polyglycosides, for example by reacting a fatty alcohol with a saccharide containing an anomeric OH, such as glucose or dextrose, in an acid medium.

Such methods of synthesis are well known and have been described in numerous documents, particularly in the Applicant's documents referred to above.

If necessary, this synthesis may be completed with operations involving neutralization, filtration, partial distillation of the excess fatty alcohol, or decolorization.

The compositions according to the present invention based on alkyl polyglycosides and fatty alcohols can be used as the main emulsifier for the preparation of a variety of emulsions.

Thus, according to a second aspect, the present patent application aims to cover emulsions comprising at least an aqueous phase and an oily phase and, as the main emulsifier, a composition based on alkyl polyglycosides and fatty alcohols, as defined above.

In general terms, such an emulsion will comprise from 1 to 25% by weight and preferably from 1 to 10% by weight of the above-mentioned emulsifying composition.

The oily phase forming part of the emulsion can consist of the fatty alcohol or fatty alcohols forming part of the emulsifying composition of the invention, without it being necessary to use another oil. More generally, however, an oil selected from the following will be used:

- oils of vegetable origin, such as sweet-almond oil, copra oil, castor oil, jojoba oil, olive oil, colza oil, groundnut oil, sunflower oil, wheat germ oil, maize germ oil, soya oil, cottonseed oil, lucerne oil, poppy oil, pumpkin oil, evening primrose oil, millet oil, barley oil, rye oil, safflower oil, candlenut oil, passiflora oil, hazelnut oil, palm oil, shea butter, apricot kernel oil, calophyllum oil, sysymbrium oil and avocado oil;
- modified vegetable oils such as the products known by the INCI names Apricot Kernel Oil PEG-6 esters and Olive Oil PEG-6 esters;
- oils of natural origin, such as perhydrosqualene and squalene;
- mineral oils such as paraffin oil or vaseline oil; and mineral oils originating especially from petroleum cuts, such as isoparaffins with boiling points of between 300 and 400° C.; and
- synthetic oils, especially fatty acid esters such as butyl myristate, propyl myristate, cetyl myristate, isopropyl palmitate, butyl stearate, hexadecyl stearate, isopropyl stearate, octyl stearate, isocetyl stearate, dodecyl oleate, hexyl laurate and propylene glycol dicaprylate; esters derived from lanolic acid, such as isopropyl lanolate and isocetyl lanolate; triglycerides such as glycerol triheptanoate; alkyl benzoates; isoparaffins; polyalphaolefins; polyolefins; synthetic isoalkanes such as isohexadecane and isododecane; and silicone oils. Among the latter, there may be mentioned more particularly dimethylpolysiloxanes, methylphenylpolysiloxanes, silicones modified by amines, silicones modified by fatty acids, silicones modified by alcohols, silicones modified by alcohols and fatty acids, silicones modified by polyether groups, epoxy-modified silicones, silicones modified by fluorinated groups, cyclic silicones and silicones modified by alkyl groups.

In general terms, the emulsions according to the present invention will comprise up to 50% by weight of oily phase as defined above.

These emulsions can be prepared simply by dispersing a fatty phase, consisting of the above-mentioned emulsifying composition and optionally one or more oils as described above, in a hydrophilic phase, generally water or a hydrophilic solvent.

The dispersion process can be carried out hot or cold, depending on the melting point of the emulsifying composition, it being necessary for all the constituents to be liquid at the time of mixing.

The emulsions obtained in this way differ from those which can be obtained from the emulsifying compositions of the state of the art in that they have remarkable textural properties and sensory characteristics, as will be demonstrated below.

These emulsions can also comprise a complementary emulsifier in an amount such that the total amount of emulsifiers in the emulsion is less than or equal to 25% by weight.

It has in fact been found, surprisingly, that the emulsifying compositions according to the present invention based on alkyl polyglycosides and fatty alcohols potentiate the emulsifying properties of a number of traditional emulsifiers, particularly those of non-ionic or anionic type, while at the same time conferring remarkable textural properties and sensory characteristics on the emulsions obtained from these mixtures of emulsifiers.

A non-ionic complementary emulsifier can be for example an ethoxylated alcohol, an ethoxylated fatty acid, a glycerol ester, an ethoxylated glycerol ester, a sorbitan ester, a polysorbate, a polyglycerol ester, a sucrose ester, an alkyl glucose ester, an ethoxylated alkyl glucose ester or a dimethicone copolyol.

An anionic complementary emulsifier can be for example an alkylsulfate, an alkylphosphate, a phosphated ethoxylated alcohol, a sulfated ethoxylated alcohol, a fatty acid soap, an acylate or a dimethicone copolyol phosphate.

The emulsifying compositions according to the present invention based on alkyl polyglycosides and fatty alcohols can also be used for the preparation of fluid emulsions. In this case, a particular complementary emulsifier or co-emulsifier, selected from ethoxylated vegetable oils and ethoxylated methyl esters of vegetable oils, will be used.

In general terms, the total amount of emulsifiers in the emulsion will be less than or equal to 25% by weight and the weight ratio of the main emulsifier, consisting of the mixture of alkyl polyglycosides and fatty alcohols, to the co-emulsifier will be between 98:2 and 20:80.

It has in fact been discovered, totally unexpectedly, that in contrast to the compositions of the state of the art based on alkyl polyglycosides and fatty alcohols, these novel emulsifying compositions of the invention, when associated with a secondary emulsifier selected from ethoxylated vegetable oils and ethoxylated methyl esters of vegetable oils, make it possible to formulate fluid emulsions whose viscosity depends little on the nature of the emulsified oil; this applies to a very wide diversity of oils, without it being necessary in each case to adjust the ratio of the composition based on alkyl polyglycosides and fatty alcohols (main emulsifier) to the secondary emulsifier.

An ethoxylated vegetable oil which can be used within the framework of the invention can be for example an ethoxylated maize oil, an ethoxylated apricot kernel oil, an ethoxylated sunflower oil, an ethoxylated colza oil, an ethoxylated jojoba oil, an ethoxylated grapeseed oil or an ethoxylated linseed oil.

An ethoxylated methyl ester of a vegetable oil can be for example an ethoxylated methyl ester of maize oil, an ethoxylated methyl ester of sunflower oil, an ethoxylated methyl ester of colza or an ethoxylated methyl ester of linseed.

It has furthermore been discovered, totally unexpectedly, that the emulsifying compositions of the invention, when associated with one or more alkyl polyglycosides having 8 to 12 carbon atoms (forming a co-surfactant), make it possible to formulate fluid emulsions whose viscosity depends little on the nature of the emulsified oil; this applies to a very wide diversity of oils, without it being necessary in each case to adjust the ratio of the composition based on alkyl polyglycosides and fatty alcohols to the co-surfactant.

Thus the present invention covers emulsions which also comprise a co-surfactant selected from alkyl polyglycosides having from 8 to 12 carbon atoms, in an amount such that the total amount of emulsifier and co-surfactant is less than or equal to 25% by weight, the weight ratio of the emulsifier to the above-mentioned co-surfactant being between 99:1 and 60:40.

The surfactant is advantageously an alkyl polyglycoside having 12 carbon atoms.

The emulsions obtained within the framework of the present invention (with or without complementary emulsifiers) are generally stable for at least 24 h at room temperature.

It has also been found that the stability of these emulsions can be considerably enhanced by adding to the emulsion synthetic polymers or natural hydrocolloids normally used in cosmetics.

Such agents capable of enhancing the stability of the emulsions will generally be used in an amount of about 0.1 to 5% by weight, based on the weight of the emulsion.

The polymers and hydrocolloids which can be used to stabilize the emulsions based on compositions according to the present invention of alkyl polyglycosides and fatty alcohols can be selected for example from:

- crosslinked or non-crosslinked acrylic or methacrylic polymers and copolymers such as carbomer, acrylate/steareth-20 methacrylate copolymers, crosslinked acrylate/$C_{10-30}$-alkyl acrylate polymers, polyglyceryl acrylate, polyglyceryl methacrylate and sodium polyacrylate;
- polymers and copolymers derived from styrene or vinyl, such as sodium polystyrenesulfonate or a crosslinked PVM/MA(polyvinyl methyl ether/maleic anhydride)/decadiene polymer;
- polymers and copolymers derived from acrylamide, such as the product known under the name polyacrylamide/$C_{13-14}$-isoparaffin/laureth-7;
- gums of natural origin, such as xanthan gum, sclerotium gum, alginates, carrageenates, glucomannans and karaya gum;
- cellulosic polymers and derivatives thereof, such as microcrystalline cellulose, carboxymethyl cellulose, methyl cellulose, hydroxyethyl cellulose, hydroxypropyl cellulose and hydroxypropyl methyl cellulose; and
- mineral compounds such as bentonites, smectites and magnesium and/or aluminum silicates.

The invention will be illustrated in greater detail by the following Examples, which are given solely by way of illustration.

EXAMPLE 1

Process for the Preparation of a Composition According to the Invention Based on Alkyl Polyglycosides and Fatty Alcohols A substantially pure $C_{14}$ cut of fatty alcohols is introduced into a multi-purpose reactor.

Glucose is also introduced into the reactor so that the molar ratio of fatty alcohol to glucose is 6/1.

The glucose is then reacted with the fatty alcohol for 5 hours at a temperature of between 100 and 105° C., in the presence of sulfuric acid as a catalyst.

The reaction is carried out under a partial vacuum of 15 mm of mercury.

After the reaction, the catalyst is neutralized with a base.

The composition obtained comprises:

75.5% of free $C_{14}$ fatty alcohol and 24.5% of $C_{14}$ alkyl glycosides.

EXAMPLES 2 TO 7

Six other compositions according to the invention based on alkyl polyglycosides and fatty alcohols were prepared in order to study especially the influence of the nature of the mixture of alkyl polyglycosides on the properties obtained.

The compositions of Examples 2, 3, 4 and 6 were prepared by following the experimental protocol described in Example 1.

The compositions by weight of the cuts of fatty alcohols used as starting materials have been given in Table I below.

The composition of Example 5 was obtained by mixing the compositions of Examples 1 and 3 in respective proportions of 30% and 70% by weight, at 80° C.

The composition of Example 7 was obtained by mixing the compositions of Examples 1 and 2 in respective proportions of 5% and 95% by weight, at 80° C.

The resulting compositions of the mixtures of alkyl polyglycosides and fatty alcohols have been given in Table II below.

COMPARATIVE EXAMPLES 1 TO 3

To demonstrate the particular properties of the compositions according to the present invention based on alkyl polyglycosides and fatty alcohols, three compositions were prepared as Comparative Examples.

The composition of Comparative Example 1 corresponds to the composition described in Example 1 of the document WO 92/06778.

The composition of Comparative Example 2 was prepared by following the experimental protocol described in Example 1, the cut of fatty alcohols used as the starting material having the composition given in Table I below.

The composition of Comparative Example 3 corresponds to the composition of Example 1 of the document WO 95/13863.

The compositions of the mixtures of Comparative Examples 1 to 3 have been collated in Table II below.

TABLE I

| | EXAMPLE ACCORDING TO THE INVENTION | | | | | COMPARATIVE EXAMPLE | | |
|---|---|---|---|---|---|---|---|---|
| | 1 | 2 | 3 | 4 | 6 | 1 | 2 | 3 |
| $C_{12}$ alcohol | 0 | 0 | 0 | 0 | 0 | 0 | 0 | 20 |
| $C_{14}$ alcohol | 100 | 0 | 0 | 0 | 0 | 0 | 0 | 28 |
| $C_{16}$ alcohol | 0 | 0.3 | 0 | 0 | 0 | 100 | 0 | 17 |
| $C_{18}$ alcohol | 0 | 5.3 | 0 | 11.3 | 0 | 0 | 46.4 | 35 |
| $C_{20}$ alcohol | 0 | 62.8 | 100 | 13.5 | 0 | 0 | 14.9 | 0 |
| $C_{22}$ alcohol | 0 | 31.6 | 0 | 75.2 | 100 | 0 | 38.7 | 0 |

TABLE II

| | EXAMPLE ACCORDING TO THE INVENTION | | | | | | | COMPARATIVE EXAMPLE | | |
|---|---|---|---|---|---|---|---|---|---|---|
| | 1 | 2 | 3 | 4 | 5 | 6 | 7 | 1 | 2 | 3 |
| $C_{12}$ alcohol | 0 | 0 | 0 | 0 | 0 | 0 | 0 | 0 | 0 | 0.3 |
| $C_{14}$ alcohol | 75.5 | 0 | 0 | 0 | 22.65 | 0 | 3.75 | 0 | 0 | 1.6 |
| $C_{16}$ alcohol | 0 | 0.1 | 0 | 0 | 0 | 0 | 0.10 | 0 | 0 | 4.5 |
| $C_{18}$ alcohol | 0 | 4.3 | 0 | 10.3 | 0 | 0 | 4.10 | 87.2 | 38.8 | 27.9 |
| $C_{20}$ alcohol | 0 | 54.5 | 85 | 12 | 59.5 | 0 | 51.70 | | 10.6 | 0 |
| $C_{22}$ alcohol | 0 | 25.9 | 0 | 64.3 | 0 | 92 | 24.60 | 0 | 35.1 | 0 |
| $C_{12}$ APG | 0 | 0 | 0 | 0 | 0 | 0 | 0 | 0 | 0 | 14.4 |
| $C_{14}$ APG | 24.5 | 0 | 0 | 0 | 7.35 | 0 | 1.30 | 0 | 0 | 18.9 |
| $C_{16}$ | 0 | 0 | 0 | 0 | 0 | 0 | 0 | 12.2 | 0 | 10.9 |

TABLE II-continued

| | EXAMPLE ACCORDING TO THE INVENTION | | | | | | | COMPARATIVE EXAMPLE | | |
|---|---|---|---|---|---|---|---|---|---|---|
| | 1 | 2 | 3 | 4 | 5 | 6 | 7 | 1 | 2 | 3 |
| APG $C_{18}$ APG | 0 | 0.8 | 0 | 1.5 | 0 | 0 | 0.75 | | 7.2 | 21.5 |
| $C_{20}$ APG | 0 | 9.6 | 15 | 1.8 | 10.5 | 0 | 9.15 | 0 | 2.3 | 0 |
| $C_{22}$ APG | 0 | 4.8 | 0 | 10.1 | 0 | 8 | 4.55 | 0 | 6 | 0 |

EXAMPLE 8

Process for the Preparation of Emulsions from an Emulsifying Composition According to the Invention or an Emulsifying Composition According to the State of the Art Various emulsions were prepared with the compositions of Examples 1 to 7 and the compositions of Comparative Examples 1 to 3.

These emulsions were prepared as follows:

A mixture consisting of an emulsifying composition, an oily phase and optionally a co-emulsifier or a co-surfactant is heated to a temperature above the melting point of the alkyl polyglycoside composition to give a liquid mixture.

The aqueous phase or a polar solvent is heated to the same temperature.

The two phases (oily and aqueous) are then homogenized by means of a Silverson apparatus, for example for a period of 3 to 6 min at 4000 rpm.

The emulsions are then cooled to room temperature, with slow stirring using an agitator of the anchor type.

Demonstration of the Textural Properties of the Emulsions Obtained by using the Compositions According to the Invention, Compared with the Compositions of the State of the Art Study No. 1

Following the experimental protocol described in Example 8, various emulsions were prepared from the compositions according to the invention described in Examples 1 to 6 and from the compositions of the state of the art described in Comparative Examples 1 to 3.

These emulsions have the following compositions:

emulsifying compositions according to the invention or according to a Comparative Example: 5%, oil (cetearyl octanoate): 20%, water: 75%.

The properties of the emulsions produced were evaluated by a panel of 6 experienced persons. The texture of the emulsions produced is evaluated by spreading about 0.2 g of emulsion over the back of the hand. In this first study, the evaluated criteria are not differentiated but estimated overall by means of a quantitative score for the texture on the following scale of 0 to 3:

The results obtained are collated in Table III.

TABLE III

| EMULSION | SCORE |
|---|---|
| Example 1 | 1.9 |
| Example 2 | 1.8 |
| Example 3 | 2.0 |
| Example 4 | 1.6 |
| Example 5 | 2.2 |
| Example 6 | 2.6 |
| Comparative Example 1 | 0 |
| Comparative Example 2 | 1.0 |
| Comparative Example 3 | 0 |

Given that the coefficient of variation of the responses obtained was at most 20%, there is a significant difference between the emulsions obtained with the compositions of Examples 1 to 6 (score $\geq 2.0$) and the emulsions obtained with the compositions of Comparative Examples 1 to 3 (score $\leq 1.0$).

Study No. 2

Following the experimental protocol described in Example 8, various emulsions were prepared from the compositions according to the invention described in Examples 2 and 3 and from the compositions of the state of the art described in Comparative Example 1.

These emulsions have the following compositions:

emulsifying composition according to the invention or according to a Comparative Example: 5%, oil (isononyl isononanoate): 20%, water: qsp 100%, carbomer 940: qs*, trometamol: qs pH 7.

* Carbomer 940 is added, if necessary, in an amount such that the BROOKFIELD LVT viscosity (no. 4 spindle—6 rpm) of the emulsions studied is in all cases similar (to within ±20%) to the viscosity obtained for Comparative Example 1.

This study was conducted by a panel of 32 experienced persons. For each emulsion studied, each volunteer on the panel ticked those of the following sensory descriptors which he considered to be most representative of the emulsion tested:

soaping, difficulty of spreading, softness, silkiness, richness, evanescence.

A texture profile of each of the emulsions can be determined from the frequency of use of the descriptors. The emulsions obtained with the compositions of Examples 2 and 3 are significantly different from the emulsion obtained with the composition of Comparative Example 1, as shown in Table IV below.

TABLE IV

| Frequency of response | Comparative Example 1 | Example 3 | Example 2 |
|---|---|---|---|
| soaping | 4.4 | 3.1 | 1.3 |
| difficulty of spreading | 7.5 | 3.8 | 3.1 |
| softness | 7.2 | 5.0 | 5.0 |
| silkiness | 4.7 | 2.8 | 2.2 |
| richness | 3.8 | 2.2 | 3.4 |
| evanescence | 2.5 | 5.6 | 6.3 |

The emulsions obtained from the compositions of Examples 2 and 3 are less soapy (i.e. better absorbed by the skin), more evanescent and easier to spread and leave less residues (less soft, less silky and less rich).

Study No. 3

Following the experimental protocol described in Example 8, various emulsions were prepared from the compositions according to the invention described in Examples 1 to 6 and from the compositions of the state of the art described in Comparative Examples 1 to 3.

These emulsions have the following compositions:
emulsifying composition according to the invention or according to a Comparative Example: 5%,
oil (copra caprylate/caprate): 20%,
water: qsp 100%,
polyacrylamide/$C_{13-14}$-isoparaffin/laureth-7: qs*.

* This polymer is added after emulsification, if necessary, in a sufficient amount for:
the viscosity of the emulsions to correspond to a value of 5000 mPa.s (measured on a BROOKFIELD LVT, no. 3 spindle, 6 rpm, 24 h after manufacture of the emulsion), in order to improve the feel of the emulsion,
the stability of the emulsion to be perfect throughout the tests.

This study was conducted by a panel of 12 experienced persons. For each emulsion tested, each of the following descriptors was scored quantitatively from 0 to 10:
fluidity,
freshness,
rapidity of absorption,
residue,
greasiness,
soaping,
richness.

The results obtained are reported in Table V below.

TABLE V

SENSORY PROFILE OF APG EMULSIONS

| DESCRIPTOR | Richness | Soaping | Greasiness | Residue | Rapidity of absorption | Freshness | Fluidity |
|---|---|---|---|---|---|---|---|
| Example 2 | 3 | 0 | 0 | 0 | 10 | 10 | 8 |
| Example 1 | 4 | 2 | 4 | 2 | 8 | 8 | 5 |
| Example 5 | 4 | 4 | 6 | 4 | 6 | 8 | 5 |
| Comparative Example 1 | 10 | 8 | 9 | 10 | 1 | 3 | 0 |
| Comparative Example 3 | 9 | 10 | 8 | 10 | 4 | 2 | 5 |

A significant finding is that the emulsions obtained from the compositions of Examples 1, 2 and 5 are characterized by their fluidity, their freshness and their rapidity of absorption, whereas the emulsions prepared from the compositions of Comparative Examples 1 and 3 are characterized by their richness, the soaping on application and the feeling of greasiness and residues they leave on the skin.

Examples of Fluid Emulsions Obtainable from the Emulsifying Compositions According to the Invention and Properties of these Fluid Emulsions Within the framework of the present patent application and the claims, "fluid emulsion" is understood as meaning an emulsion which begins to flow through a 6 mm ISO 2 431 flow cup less than 5 s after removal of the plug (test according to international standard ISO 2 431).

Fluid emulsions which may be mentioned in particular are milks, especially milks of the oil-in-water type, for use in cosmetics or hygiene, such as make-up remover milks, body milks or sun milks.

Fluid emulsions are also used in the pharmaceutical or veterinary sector.

The following study made it possible to show that the emulsifying compositions according to the invention based on alkyl polyglycosides and fatty alcohols very easily form fluid emulsions stable for at least one week at room temperature when said compositions are used as the main emulsifier in association with a co-emulsifier selected from an ethoxylated vegetable oil and an ethoxylated methyl ester of a vegetable oil.

The novelty of the emulsifying compositions according to the invention, compared with the emulsifying compositions of the state of the art based on alkyl polyglycosides and fatty alcohols, is in the fact that they enable stable fluid emulsions to be formulated whose viscosity depends little on the nature of the emulsified oil.

Moreover, it is possible to use a single ratio of main emulsifier (alkyl polyglycoside and fatty alcohol) to secondary emulsifier or co-emulsifier (ethoxylated vegetable oil or ethoxylated methyl ester of vegetable oil) for emulsifying a very wide diversity of oils.

Study No. 1

Following the experimental protocol described in Example 8, various emulsions were prepared from a composition according to the invention and a co-emulsifier consisting of an apricot kernel oil ethoxylated with 40 mol of EO.

These emulsions have the following compositions:

emulsifying composition according to the invention: 2.7%,
co-emulsifier (apricot kernel oil ethoxylated with 40 mol of EO): 0.3%,
oil: 10%,
water: 87%.

Fluid emulsions stable for at least one week at room temperature were thus obtained by using various emulsifying compositions according to the invention and the following oils: cetearyl octanoate, sweet-almond oil, isododecane, isononyl isononanoate, triheptanoin, copra caprylate/caprate, diisopropyl dimer dilinoleate, glycerol caprylate/caprate, squalane, dimethicone, jojoba oil and safflower oil.

It was also observed that, for the same ratio of main emulsifier to co-emulsifier, it was possible to obtain fluid emulsions for this wide variety of oils, their viscosity depending little on the nature of the oil and always being below 10,000 mPa.s, as shown in Table VI below.

TABLE VI

| Oil | BROOKFIELD DV viscosity no. 3 or 4 spindle 6 rpm measured at room temperature 24 h after manufacture of the emulsion |
|---|---|
| cetearyl octanoate | 4000 mPa.s |
| sweet-almond oil | 3000 mPa.s |
| isododecane | 5700 mPa.s |
| isononyl isononanoate | 2500 mPa.s |
| triheptanoin | 4700 mPa.s |
| copra caprylate/caprate | 4300 mPa.s |
| diisopropyl dimer dilinoleate | 4900 mPa.s |
| glycerol caprylate/caprate | 3300 mPa.s |
| squalane | 4600 mPa.s |
| dimethicone | 1700 mPa.s |
| jojoba oil | 3800 mPa.s |
| safflower oil | 2800 mPa.s |

Emulsions prepared from the emulsifying compositions of Comparative Examples 1 and 3 and a co-emulsifier consisting of an ethoxylated apricot kernel oil (40 mol of EO) or ethoxylated maize oil (40 mol of EO), in the same relative proportions as those of the emulsions prepared above, were found to be fluid but unstable for the oils tested above.

Use of the Compositions According to the Invention Based on Alkyl Polyglycosides and Fatty Alcohols for the Formulation of Emulsions for Cosmetic, Pharmaceutical or Veterinary use, in Association with Traditional Emulsifying Systems The studies conducted showed that the compositions according to the present invention based on alkyl polyglycosides and fatty alcohols potentiate the emulsifying properties of the traditional emulsifying systems and make it possible to obtain emulsions with improved textural properties and sensory characteristics.

Study No. 1

Following the experimental protocol described in Example 8, various emulsions were prepared from the compositions according to the invention described in Examples 1 and 2 and a co-emulsifier consisting of a traditional PEG-100 stearate/glyceryl stearate system.

Three types of formulation (designated I, II and III respectively) were studied for three types of oils (paraffin oil, cetearyl octanoate, $C_8$–$C_{10}$ triglycerides).

Table VII below gives the compositions of the formulations studied.

The stability of the emulsions prepared in this way was measured and the results obtained have been collated in Table VIII.

As can be seen from this Table, the use of an emulsifying composition according to Example 1 makes it possible to stabilize the emulsion obtained for each of the three types of oils studied.

TABLE VI

| FORMULATION | I | II | III |
|---|---|---|---|
| Co-emulsifier (PEG-100 stearate/glyceryl stearate) | 3% | 3% | 5% |
| Emulsifier of the invention (Example 1) | — | 2% | — |
| Oil | 10% | 10% | 10% |
| Water | qsp 100% | qsp 100% | qsp 100% |

TABLE VIII

| Oil | Paraffin oil | Cetearyl octanoate | $C_8$–$C_{10}$ triglyceride |
|---|---|---|---|
| I | unstable on D1 | unstable on D1 | unstable on D1 |
| II | stable after 1 month | stable after 1 month | stable after 1 month |
| III | unstable on D1 | unstable on D1 | unstable on D1 |

Study No. 2

A study similar to the previous one was conducted, the emulsifying composition of Example 1 being replaced, in the emulsion, with an emulsifying composition according to Example 2.

The compositions of the formulations studied are given in Table IX, the results of the stability studies being given in Table X.

TABLE IX

| FORMULATION | I | II | III | IV |
|---|---|---|---|---|
| Co-emulsifier (PEG-100 stearate/glyceryl stearate) | 3% | 2% | 3% | 5% |
| Emulsifier of the invention (Example 2) | — | 3% | 2% | — |
| Oil | 10% | 10% | 10% | 20% |
| Water | qsp 100% | qsp 100% | qsp 100% | qsp 100% |

TABLE X

| Oil | I | II | III | IV |
|---|---|---|---|---|
| Paraffin oil | unstable on D1 | stable after 3 months | stable after 3 months | unstable on D1 |
| Cetearyl octanoate | unstable on D1 | stable after 3 months | stable after 3 months | unstable on D1 |
| Sweet-almond oil | unstable on D1 | stable after 3 months | stable after 3 months | unstable on D1 |
| Dimethicone | unstable on D1 | stable after 3 months | stable after 3 months | unstable on D1 |
| $C_8$–$C_{10}$ triglyceride | unstable on D1 | stable after 3 months | stable after 3 months | unstable on D1 |

Study No. 3

In this study, which was similar to study no. 1, the emulsifying system used consisted of a composition according to the invention of Example 1 and a co-emulsifying system consisting of sorbitan stearate and polysorbate 60.

The compositions of the formulations studied are given in Table XI, the results of the stability studies being given in Table XII.

TABLE XI

|  | I | II |
|---|---|---|
| Sorbitan stearate | x | x |
| Polysorbate 60 | y | y |
| Emulsifier of the invention (Example 1) | — | 2% |
| Oil | 10% | 10% |
| Water | qsp 100% | qsp 100% |

Oils Studied:
  paraffin oil: x=1.2 and y=1.8 (corresponding to the optimal ratio for the oil in question)
  cetearyl octanoate: x=1.6 and y=1.4 (corresponding to the optimal ratio for the oil in question)
  $C_8$–$C_{10}$ triglyceride: x=1.5 and y=1.5 (corresponding to the optimal ratio for the oil in question)

TABLE XII

| OIL | I | II |
|---|---|---|
| Paraffin oil | phase separation after 1 month fluid formulation no texture | stable after 3 months light, silky and evanescent texture |
| Cetearyl octanoate | phase separation after 7 days fluid formulation no texture | stable after 3 months light, silky and evanescent texture |
| $C_8$–$C_{10}$ triglyceride | phase separation after 1 day fluid formulation no texture | stable after 3 months light, silky and evanescent texture |

Example of Fluid Emulsions Obtainable from the Compositions According to the Invention Based on Alkyl Polyglycosides and Fatty Alcohols, and One or More Alkyl Polyglycosides Having 8 to 12 Carbon Atoms Study No. 1

Following the experimental protocol described in Example 8, three emulsions were prepared from the composition described in Example 7 and, as co-surfactant, an APG having 12 carbon atoms.

These emulsions have the following compositions:

Emulsifying composition according to Example 7: 2.7%,

Co-surfactant ($C_{12}$ APG): 0.3%,

Oil: 10%,

Polymer (polyacrylamide/$C_{13}$–$C_{14}$-isoparaffin/laureth-7): 0.5%,

Water: qsp 100%.

Fluid emulsions stable for at least 1 week at room temperature were thus obtained by using the various oils below:

cetearyl octanoate $C_8$–$C_{10}$ triglyceride paraffin oil

What is claimed is:

1. An alkyl polyglycoside and fatty alcohol composition, comprising:
    a) 8 to 25% by weight of an alkyl polyglycoside component consisting essentially of:
        0 to 15% by weight of at least one alkyl polyglycoside of formula (I):

$$R_1O(G_1)_{x1} \quad (I)$$

in which $R_1$ is a linear or branched alkyl radical having 16 or 18 carbon atoms, $G_1$ is a saccharide residue and x1 is between 1 and 5;

0 to 25% by weight of an alkyl polyglycoside of formula (II):

$$R_2O(G_2)_{x2} \quad (II)$$

in which $R_2$ is a linear or branched alkyl radical having 14 carbon atoms, $G_2$ is a saccharide residue and x2 is between 1 and 5; and 75 to 100% by weight of at least one alkyl polyglycoside of formula (III):

$$R_3O(G_3)_{x3} \quad (III)$$

in which $R_3$ is a linear or branched alkyl radical having 20 or 22 carbon atoms, $G_3$ is a saccharide residue and x3 is between 1 and 5; and
    b) 75 to 92% by weight of at least one alcohol of formula R' OH in which R' is a linear or branched aliphatic radical having from 14 to 22 carbon atoms, said at least one alcohol having an alkyl radical identical to each said alkyl radical $R_1$, $R_2$ and $R_3$ present in the composition in said alkyl polyglycoside component.

2. Composition according to claim 1, comprising:

8 to 18% by weight of said alkyl polyglycoside component consisting essentially of 0 to 15% by weight of at least one alkyl polyglycoside of formula (I), 0 to 25% by weight of an alkyl polyglycoside of formula (II) and 75 to 100% by weight of at least one alkyl polyglycoside of formula (III); and 85 to 92% by weight of said at least one alcohol, said at least one alcohol comprising an alcohol having an alkyl moiety identical to each of the alkyl radicals $R_1$, $R_2$ and $R_3$ present in the composition in said alkyl polyglycoside component.

3. An emulsion comprising at least an aqueous phase and an oily phase and, as a primary emulsifier, an alkyl polyglycoside and fatty alcohols composition according to claim 2.

4. Emulsion according to claim 3, comprising from 1 to 25% by weight of said primary emulsifier and up to 50% by weight of said oily phase.

5. Emulsion according to claim 3, comprising an additional emulsifier in an amount such that the total amount of said primary and additional emulsifiers is less than or equal to 25% by weight.

6. Emulsion according to claim 5, wherein the additional emulsifier is a non-ionic agent selected from the group consisting of an ethoxylated alcohol, an ethoxylated fatty acid, a glycerol ester, an ethoxylated glycerol ester, a sorbitan ester, a polysorbate, a polyglycerol ester, a sucrose ester, an alkyl glucose ester, an ethoxylated alkyl glucose ester and a dimethicone copolyol.

7. Emulsion according to claim 5, wherein the additional emulsifier is an anionic agent selected from the group consisting of an alkylsulfate, an alkylphosphate, a phosphated ethoxylated alcohol, a sulfated ethoxylated alcohol, a fatty acid soap, an acylate and a dimethicone copolyol phosphate.

8. Emulsion according to claim 3, additionally comprising a co-emulsifier selected from the group consisting of ethoxylated vegetable oils and ethoxylated methyl esters of vegetable oils, wherein said primary and co-emulsifier are present in a total amount of less than or equal to 25% by weight, the primary emulsifier and the co-emulsifier being present in a weight ratio of between 98:2 and 20:80.

9. Emulsion according to claim 8, wherein the co-emulsifier is selected from the group consisting of an ethoxylated maize oil, an ethoxylated apricot kernel oil, an ethoxylated sunflower oil, an ethoxylated colza oil, an ethoxylated jojoba oil, an ethoxylated grapeseed oil, an ethoxylated linseed oil, an ethoxylated methyl ester of maize oil, an ethoxylated methyl ester of colza oil and an ethoxylated methyl ester of linseed oil.

10. Emulsion according to claim 3, further comprising a co-surfactant selected from the group consisting of alkyl polyglycosides having from 8 to 12 carbon atoms, wherein the emulsifier and co-surfactant are present in a total amount of less than or equal to 25% by weight, the emulsifier and the co-surfactant being present in a weight ratio of between 99:1 and 60:40.

11. Emulsion according to claim 10, wherein the co-surfactant is an alkyl polyglycoside having 12 carbon atoms.

12. Emulsion according to claim 3, further comprising a synthetic polymer or a natural hydrocolloid in an amount of about 0.1 to 5% by weight.

13. Emulsion according to claim 12, wherein the synthetic polymer or natural hydrocolloid is selected from the group consisting of:
- crosslinked and non-crosslinked acrylic and methacrylic polymers and copolymers;
- styrene and vinyl polymers and copolymers;
- acrylamide polymers and copolymers;
- gums of natural origin;
- cellulosic polymers and cellulose ethers; and
- mineral compounds.

14. Composition according to claim 1, wherein said alkyl polyglycoside component consists essentially of about 30% by weight of said alkyl polyglycoside of formula (II) and about 70% by weight of said alkyl glycoside of formula (III) having 20 carbon atoms.

15. An alkyl polyglycoside and fatty alcohol composition, comprising:
  a) 10 to 20% by weight of an alkyl polyglycoside component consisting essentially of:
     0 to 20% by weight of at least one alkyl polyglycoside of formula (I):

$$R_1O(G_1)_{x1} \quad (I)$$

in which $R_1$ is a linear or branched alkyl radical having 16 or 18 carbon atoms, $G_1$ is a saccharide residue and x1 is between 1 and 5;

20 to 40% by weight of an alkyl polyglycoside of formula (II):

$$R_2O(G_2)_{x2} \quad (II)$$

in which $R_2$ is a linear or branched alkyl radical having 14 carbon atoms, $G_2$ is a saccharide residue and x2 is between 1 and 5; and 60 to 80% by weight of at least one alkyl polyglycoside of formula (III):

$$R_3O(G_3)_{x3} \quad (III)$$

in which $R_3$ is a linear or branched alkyl radical having 20 or 22 carbon atoms, $G_3$ is a saccharide residue and x3 is between 1 and 5; and b) 80 to 90% by weight of at least one alcohol of formula R'OH in which R' is a linear or branched aliphatic radical having from 14 to 22 carbon atoms, said at least one alcohol comprising a mixture of alcohols of formula $R_2OH$ and $R_3OH$, where $R_2$ and $R_3$ are identical to $R_2$ and $R_3$ in the composition in the alkyl polyglycoside component.

16. Composition according to claim 15, wherein said alkyl polyglycoside component consists essentially of about 30% by weight of said alkyl polyglycoside of formula (II) and about 70% by weight of said alkyl glycoside of formula (III) having 20 carbon atoms.

* * * * *